(12) United States Patent
Zirwas

(10) Patent No.: US 9,929,819 B2
(45) Date of Patent: Mar. 27, 2018

(54) OPPORTUNISTIC COMP WITH LOW RATE LOW LATENCY FEEDBACK

(71) Applicant: NOKIA SOLUTIONS AND NETWORKS MANAGEMENT INTERNATIONAL GMBH, Munich (DE)

(72) Inventor: Wolfgang Zirwas, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 0 days.

(21) Appl. No.: 15/113,011

(22) PCT Filed: Jan. 21, 2014

(86) PCT No.: PCT/EP2014/051130
§ 371 (c)(1),
(2) Date: Jul. 20, 2016

(87) PCT Pub. No.: WO2015/110146
PCT Pub. Date: Jul. 30, 2015

(65) Prior Publication Data
US 2017/0012724 A1    Jan. 12, 2017

(51) Int. Cl.
*H04B 17/21*  (2015.01)
*H04B 17/373* (2015.01)
*H04B 17/391* (2015.01)

(52) U.S. Cl.
CPC ........... *H04B 17/373* (2015.01); *H04B 17/21* (2015.01); *H04B 17/3913* (2015.01)

(58) Field of Classification Search
CPC ..... H04B 7/0417; H04B 7/0626; H04B 17/21
See application file for complete search history.

(56) References Cited

U.S. PATENT DOCUMENTS 9,306,642 B2 * 4/2016 Wild ................... H04B 7/0417
2011/0280287 A1 * 11/2011 Cheng ................. H04L 1/0019
375/219

FOREIGN PATENT DOCUMENTS

EP    2501068 A1    9/2012

OTHER PUBLICATIONS

International Search Report and Written Opinion for International Application PCT/EP2014/051130, dated Apr. 15, 2014, 13 pages.
Artist4G; "Interference Avoidance techniques and system design"; Project Report; Jul. 2012; https://ict-artist4g.eu; 276 pages.
Aronsson; "Channel Estimation and Prediction for MIMO OFDM Systems Key Design and Performance Aspects of Kalman-based Algorithms"; Uppsala University; Mar. 2011, 261 pages.

(Continued)

*Primary Examiner* — Tuan H Nguyen
(74) *Attorney, Agent, or Firm* — Brake Hughes Bellermann LLP

(57) ABSTRACT

A method and an apparatus is provided by which a transmission is received on a transmission channel, wherein the transmission channel includes a plurality of channel units via which transmission is carried out; channel prediction values for at least one of the plurality of channel units are obtained; it is determined whether the channel prediction value of the at least one channel unit is correct or not, and, in case the channel prediction value is not correct, an error of the at least one channel unit is reported.

22 Claims, 7 Drawing Sheets

(56) References Cited

OTHER PUBLICATIONS

Nagaraj S et al.; "Prediction error based feedback for downlink transmit beamforming", 2001 IEEE International Conference on Acoustics, Speech, and Signal Processing (ICASSP), vol. 5, May 7, 2001, pp. 2969-2972.

\* cited by examiner

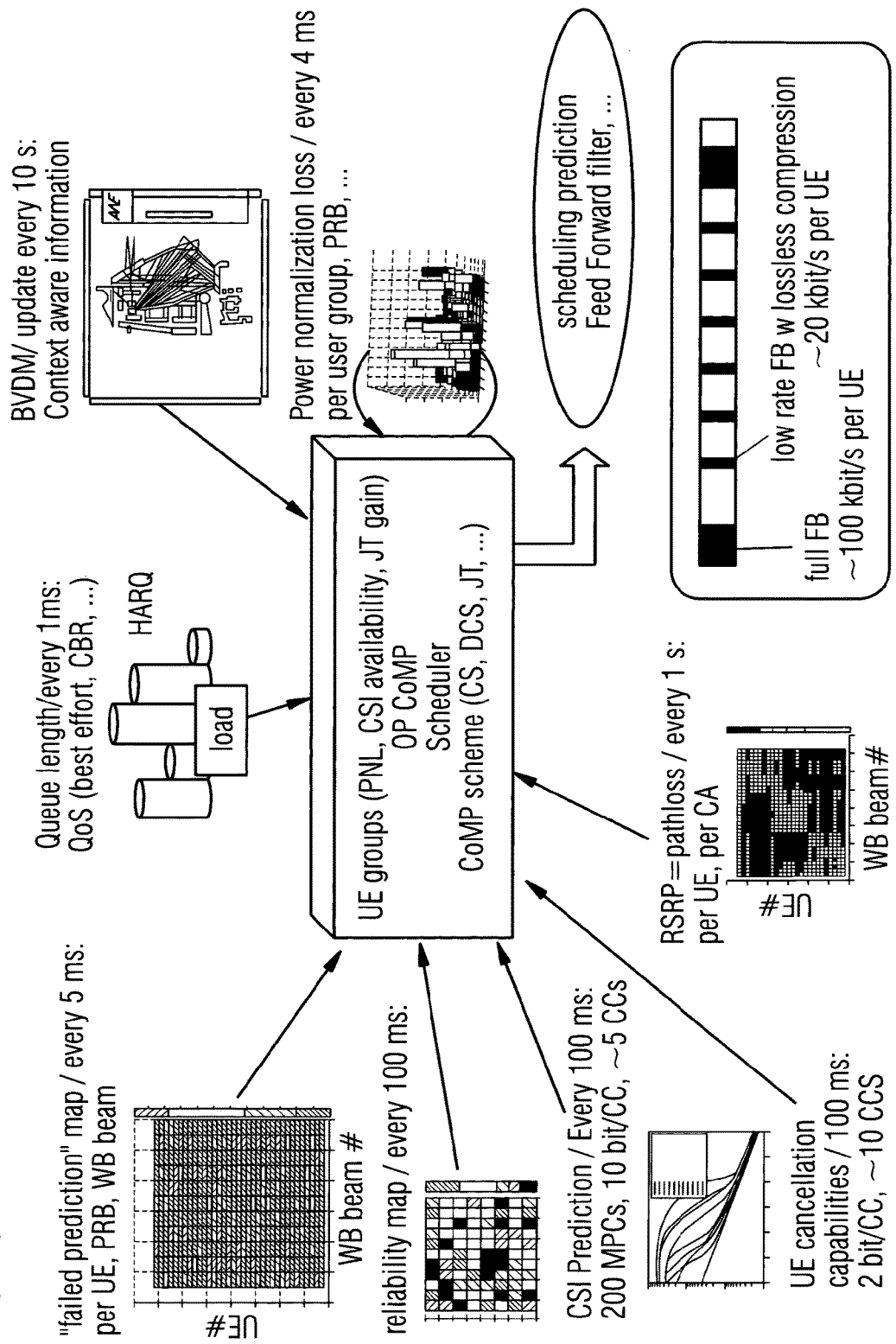

OPPORTUNISTIC COMP WITH LOW RATE LOW LATENCY FEEDBACK

This application is a national stage entry of PCT Application No. PCT/EP2014/051130, filed Jan. 21, 2014, entitled "OPPORTUNISTIC COMP WITH LOW RATE LOW LATENCY FEEDBACK" which is hereby incorporated by reference in its entirety.

FIELD OF THE INVENTION

The present invention relates to an apparatus, a method and a computer program product for.

RELATED BACKGROUND ART

The following meanings for the abbreviations used in this specification apply:
ARTIST4G—Advanced Radio Interface TechnologIes for 4G SysTems
BVDM—Building Vector Data Map
CA—Cooperation Area
CBR—Constant Bit Rate
CC—Channel Component
CoMP—Cooperative multipoint transmission
C-RNTI—Cell Radio Network Temporary Identifier
CS—Coordinated Scheduling
CSI—Channel state information
DL—Downlink
ENB—enhanced node B
IRC—Interference Rejection Receiver
JT—Joint Transmission
JT CoMP—Joint Transmission CoMP
PRB—Physical resource block
PDCCH—Physical DL control channel
PDSCH—Physical DL shared channel
PMI—Precoding Matrix Index
PNL—Power Normalization Loss
PUCCH—Physical UL control channel
PUSCH—Physical UL shared channel
QoS—Quality of Service
RRM—Radio Resource Management
RSRP—Reference Signal Received Power
RX—Receiver
SF—Subframe
SINR—Signal to Interference plus Noise Ratio
SoA—Service oriented Architecture
TX—Transmitter
UE—User equipment
UL—Uplink Embodiments of the present invention relate to the future evolution of mobile radio systems going beyond LTE Advanced so called 5G systems. Focus is on a robust integration of joint transmission—cooperative multipoint (JT CoMP) into an overall interference mitigation framework, which is assumed to integrate small cells into a wide area network. An important further aspect is an overall small feedback overhead for CSI reporting.

Robustness—especially in the context of channel prediction—is very important, as channel prediction is typically unreliable and it can be assumed that standardization of such a technique for the support of JT CoMP will be difficult without a predictable performance.

In the EU funded project Artist4G a so called interference mitigation framework (IMF-A) (1. ARTIST4G consortium, "D1.4—Interference Avoidance techniques and system design," project report, July, 2012) has been developed and investigated providing for interference limited scenarios significant performance gains (e.g. more than 100%) under the assumption of perfect channel knowledge. IMF-A includes several techniques like JT CoMP, interference floor shaping and specific user grouping and CoMP scheduling techniques.

The main challenge is JT CoMP due to its sensitivity to channel state information (CSI) estimation and prediction errors, especially for fast moving UEs. At the same time JT COMP is often the most powerful technology to overcome—or even to exploit—strong interference conditions generated by neighbouring sites, which ensures gains even for fully or heavily loaded systems.

In real world multi site measurements—as well as in recent METIS investigations e.g. from HHI—, state of the art channel prediction helped to keep a more or less significant part of these performance gains even for mobile users, verifying the potential of the IMF-A framework.

A typical cooperation area of the IMF-A framework of size nine cells with e.g. four antenna elements each will comprise already 36 channel components per user equipment (UE), leading to a high sensitivity against CSI reporting and corresponding precoding errors. One reason for this sensitivity is the high number of relevant channel components (CC) and each one will contribute more or less degradations due to prediction errors. Fortunately many of the channel components are weak, which allows partial reporting of CCs above a certain threshold. Nonetheless the number of relevant CCs is still quite high.

Massive MIMO—as proposed for 5G wide area—might help to reduce the number of relevant channel components by focusing energy to the intended users. Contrarily the inclusion of small cells into an overall interference mitigation framework will put new challenges onto the channel reporting and precoding due to the potentially high number of small cells per wide area macro cell. Note, here in band service of small cells is being assumed.

One way to overcome the unreliability of channel prediction is to limit the prediction horizon to one or few tenth of the RF wavelength $\lambda$ (carrier wavelength). This puts a natural limit on the mobile speed to one to few kmh or has to be paid by quite some performance losses.

Robust precoding as proposed in Artist4G is based on additional reliability feedback per channel component allowing to adapt the JT precoder to the expected uncertainties of the channel components. This exploits a given channel knowledge as far as possible, but has to be paid by an adaptation to the expected worst case performance, i.e. few unreliable channel components might generate significant performance losses.

It has been shown that advanced receivers—consisting of more than one antenna element—may partly adapt to the precoding errors so that the usable prediction horizon for JT CoMP can be increased.

For feedback compression many techniques are known in the meantime like lossless compression, tracking solutions, codebook based precoding, etc., but still reporting overhead will be relatively high or precoding performance will be degraded due to limited channel knowledge.

SoA for channel prediction includes Wiener- or Kalman filtering and geometrical models with parameter based channel prediction. From literature even optimum Kalman filtering has a limited prediction horizon of 0.1 to few tenth of $\lambda$ (see D. Aronsson, "Channel estimation and prediction for MIMO OFDM systems—Key design and performance aspects of Kalman-based algorithms", Ph.D Thesis, Dept. of Engineering Sciences, Signals and Systems Group, Uppsala University, March 2011).

SUMMARY OF THE INVENTION

Embodiments of the present invention address this situation and aim to overcome the above-described problem and to provide a mechanism for channel prediction with reduced reporting overhead.

According to a first aspect of the present invention an apparatus is provided which comprises
  a processor and
  a memory for storing instructions to be executed by the processor, wherein the processor is configured
  to receive transmission on a transmission channel, wherein the transmission channel comprises a plurality of channel units via which transmission is carried out,
  to obtain channel prediction values for at least one of the plurality of channel units,
  to determine whether the channel prediction value of the at least one channel unit is correct or not, and,
  in case the channel prediction value is not correct, to report an error of the at least one channel unit.

According to a second aspect of the present invention a method is provided which comprises
  receiving transmission on a transmission channel, wherein the transmission channel comprises a plurality of channel units via which transmission is carried out,
  obtaining channel prediction values for at least one of the plurality of channel units,
  determining whether the channel prediction value of the at least one channel unit is correct or not, and,
  in case the channel prediction value is not correct, reporting an error of the at least one channel unit.

The first aspect and the second aspect may be modified as follows:

The error may be reported on a dedicated channel. The dedicated channel may be on a pre-arranged uplink resource.

It may be determined whether the channel prediction value of the at least one channel unit is correct or not by comparing the channel prediction value with an actually received channel value.

It may be determined that a channel prediction value is not correct when a difference between the channel prediction value and the actually received channel value exceeds a prediction accuracy threshold.

The error may be reported by forming a map in which a plurality of channel units are mapped and channel units with a correct channel prediction value are indicated by a first indication value and channel units with an incorrect channel prediction value are indicated by a second indication value.

In this case, a channel unit may be indicated with the second indication value only upon a first occurrence of an error, and this channel unit may be indicated upon a second occurrence of an error with the first indication value.

The above map may be compressed, for example by using a lossless compression.

Moreover, it may be reported only for a group of channel units whether a channel prediction value is correct or not.

The group of channel units may comprise channel units which were considered as unreliable based on earlier measurements, and/or a specific type of channel units, and/or channel units to be used for a specific cooperative multipoint transmission.

Furthermore, a certain uplink power may be transmitted on the channel unit depending on the error.

Moreover, a control message may be received from a network control element including information regarding a size of a cooperation area, wherein the cooperation area includes a plurality of channel units, and the information indicates channel units of the cooperation area which are to be used and/or channel units of the cooperation area which are not to be used.

The reports may be established such that they also include further information about the strength and/or the phase of the error.

The methods and processes according to the first and second aspects and/or their modifications may be carried out by a network element such as a user equipment or a part thereof.

According to a third aspect of the present invention an apparatus is provided which comprises
  a processor and
  a memory for storing instructions to be executed by the processor, wherein the processor is configured
  to perform transmission on a transmission channel, wherein the transmission channel is divided into a plurality of channel units, and
  to receive a report as to whether a channel prediction value for a at least one of the channel units is not correct.

According to a fourth aspect of the present invention a method is provided which comprises
  performing transmission on a transmission channel, wherein the transmission channel is divided into a plurality of channel units, and
  receiving a report as to whether a channel prediction value for a at least one of the channel units is not correct.

The third and fourth aspects may be modified as follows:

The error may be received on a dedicated channel, wherein optionally the dedicated channel may be on a pre-arranged uplink resource.

The report may be in form of a map in which a plurality of channel units are mapped and channel units with a correct channel prediction value are indicated by a first indication value and channel units with an incorrect channel prediction value are indicated by a second indication value.

In this case, a channel unit may be indicated with the second indication value only upon a first occurrence of an error, and this channel unit may be indicated upon a second occurrence of an error with the first indication value.

The above map may be compressed, for example by using a lossless compression.

The report may indicate only for a group of channel units whether a channel prediction value is correct or not.

The group of channel units may comprise channel units which were considered as unreliable based on earlier measurements, and/or a specific type of channel units, and/or channel units to be used for a specific cooperative multipoint transmission.

Based on the report, a transmission scheme may be adapted. For example, for the transmission scheme only those channel units are used for which no error was reported.

Moreover, a cooperation area including a plurality of channel units may be defined, the cooperation area comprising a size which depends on the number of channel units, and the size of the cooperation area may be reduced by taking into account channel units for which errors were reported.

A control message may be sent to at least one user equipment, the control message including information regarding the size of the cooperation area, wherein this information may indicate channel units of the cooperation area which are to be used and/or channel units of the cooperation area which are not to be used.

The reports may include further information about the strength and/or the phase of the error. Based on this information, the transmission scheme may be adapted, e.g., a precoder may be correspondingly adapted.

The methods and processes according to the third and fourth aspects and/or their modifications may be carried out by a network control element such as an eNB or a part thereof.

According to a fifth aspect of the present invention a computer program product is provided which comprises code means for performing a method according to the second or fourth aspects and/or their modifications when run on a processing means or module. The computer program product may be embodied on a computer-readable medium.

It is to be understood that any of the above modifications can be applied singly or in combination to the respective aspects and/or embodiments to which they refer, unless they are explicitly stated as excluding alternatives.

BRIEF DESCRIPTION OF THE DRAWINGS

These and other objects, features, details and advantages will become more fully apparent from the following detailed description of embodiments of the present invention which is to be taken in conjunction with the appended drawings, in which:

FIG. 10 illustrates an OP CoMP scheduler according to an embodiment of the present invention.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Before describing embodiments of the present invention, however, the problem underlying the present application is summarized again.

A general goal of embodiments of the invention is to approach the performance bound of a full JT CoMP system with the minimum possible complexity and maximum robustness by a suitable combination of techniques like coordinated scheduling, dynamic cell selection, network assisted receivers, antenna tilting etc.

In particular, a main observation for embodiments of the present invention is that (probably all) channel prediction techniques—like for example Kalman filtering—experiences a strong variance in the prediction quality over different subcarriers or in case of LTE over different physical resource blocks (PRB).

Figure 2:
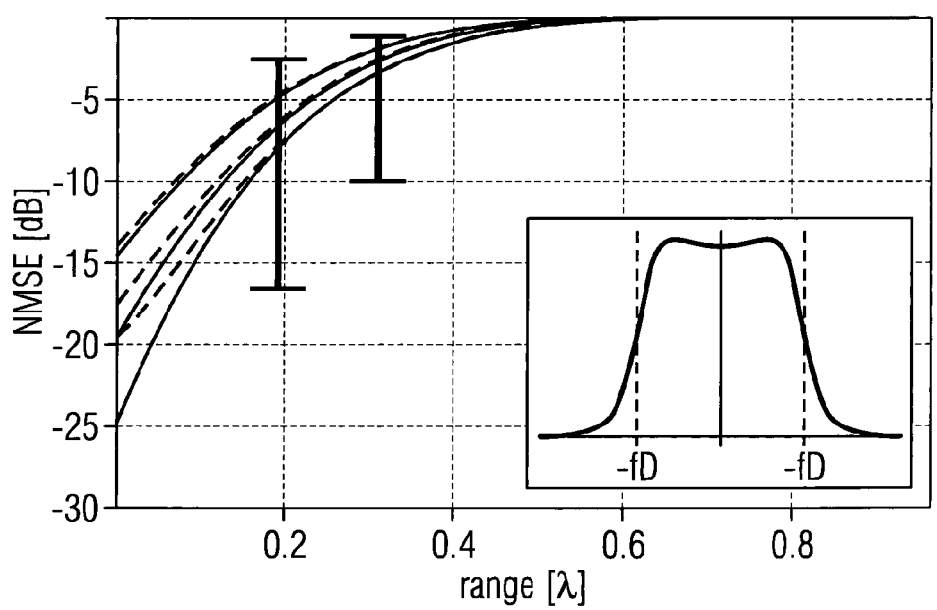
FIG. 2 illustrates a typical normalized means square error (NMSE) over prediction horizon in wavelengths.

FIG. 2 illustrates a typical normalized means square error (NMSE) over prediction horizon in wavelengths. After $0.2\lambda$ the NMSE is already close to $-5$ dB and at $0.5\lambda$ the prediction fails completely. Interestingly the fast increase of the normalized mean square error (NMSE) over prediction time (FIG. 2) will be caused often by few to very few channel components on few specific physical resource blocks (PRB).

Figure 4:
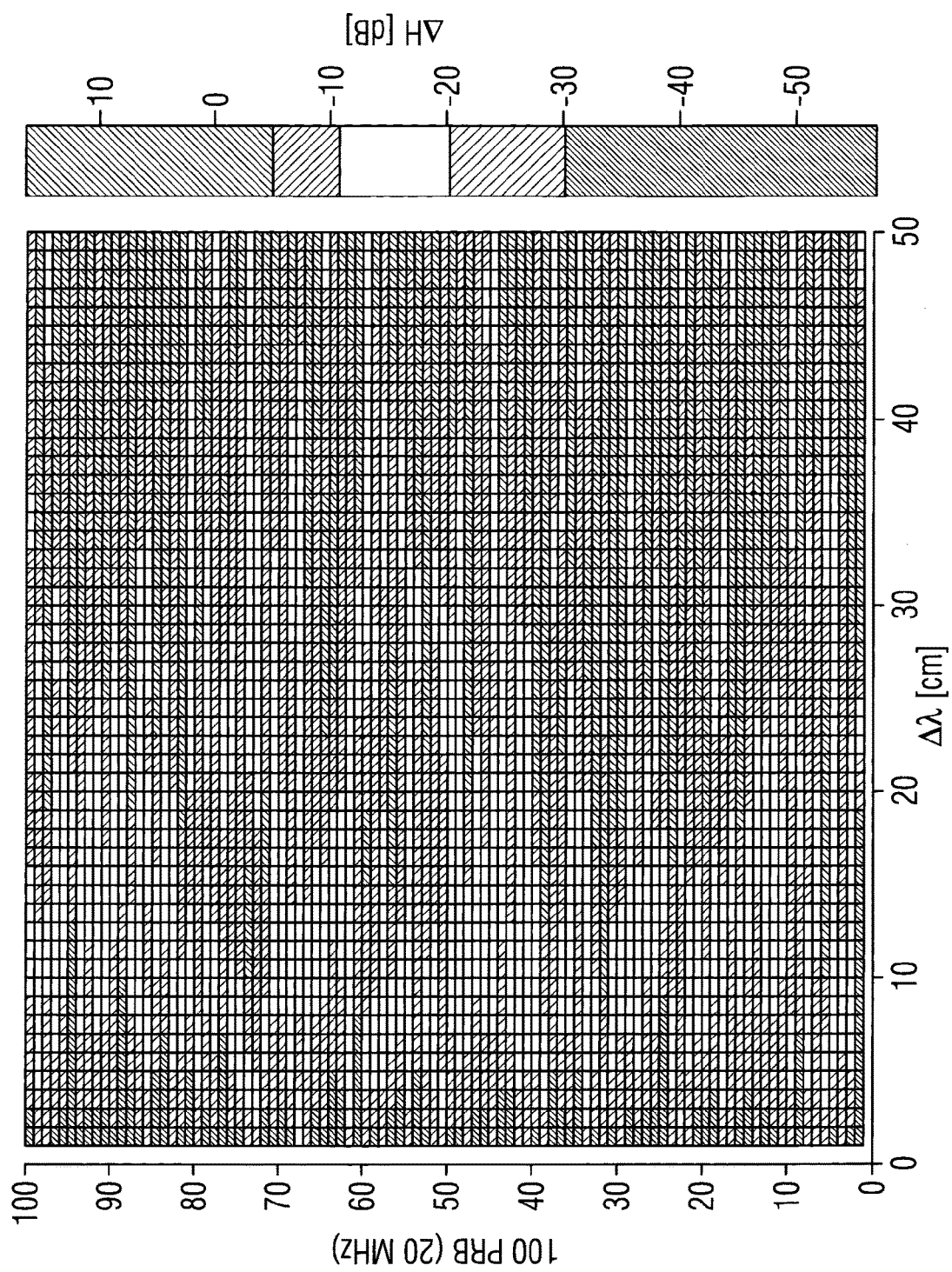
FIG. 4 illustrates a prediction NMSE error in dB for a moving UE for 100 PRBs.

FIG. 4 illustrates an example for a prediction NMSE error in dB for a moving UE for 100 PRBs. The RF wavelength $\lambda$ is 11-12 cm. In FIG. 4 the NMSE error in dB is coded by different grey shades for an artificial radio channel for an increasing distance from the location where the CSI prediction has been done for a bandwidth of 100 PRBs.

While prediction for some of the subcarriers or PRBs is fine for one or even two $\lambda$ on other resources the NSME is in the range of $-10$ dB already after two to four cm (0.2 to $0.4\lambda$). Important is that a few bad predictions will dominate the overall NMSE calculation over all PRBs. The overall NMSE is therefore not a good criterion for evaluation of the potential of channel prediction. Note in FIG. 2 the variance of the NMSE is indicated by the solid perpendicular thick lines.

From a system point of view it is beneficial to exploit the very limited number of failing predictions (bad PRBs) as it allows to just report these few miss-predicted channel components to the JT precoder. This reporting has to be done over a low rate low latency pre-scheduled UL control channel so that the JT precoder can be adapted accordingly based on latest possible information.

The main difference compared to SoA robust precoding as proposed in Artist4G is that the reliability information feedback gives just a probability that a certain channel component might fail in the future, while reporting of the few bad channel components gives the precoder accurate information about good and badly predicted channel components.

However, as mentioned above, this reporting leads to a considerable overhead. Hence, embodiments of the present invention aim to reduce this overhead.

In the following, a general embodiment of the present invention is described by referring to FIG. 1.

Figure 1:
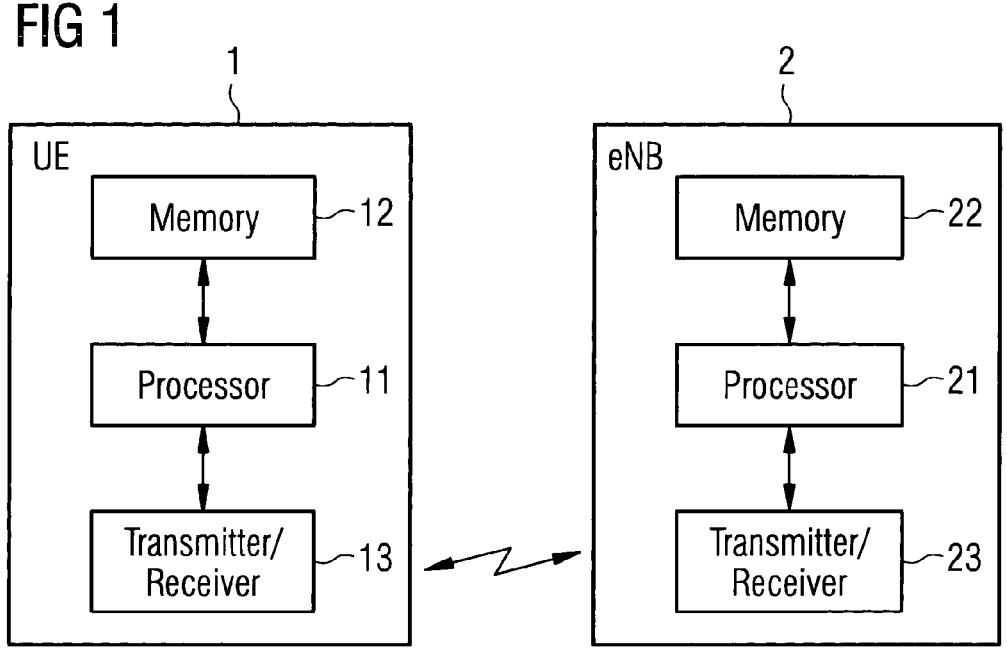
FIG. 1 shows simplified structures of network elements according to an embodiment of the present invention.

In particular, FIG. 1 shows several elements involved in the procedure according to embodiments of the present invention, in this case a UE 1 and an eNB 2 as corresponding examples.

The UE 1 is an example for a mobile terminal. The corresponding apparatus may also be only a part of the UE or the mobile terminal.

The UE 1 comprises a processor 11 and a memory 12 for storing instructions to be executed by the processor. The processor 11 is configured to receive transmission on a transmission channel, wherein the transmission channel comprises a plurality of channel units (as examples for subcarriers, CCs, PRB etc.) via which transmission is carried out, to obtain channel prediction values for at least one of the plurality of channel units, to determine whether the channel prediction value of the at least one channel unit is correct or not, and, in case the channel prediction value is not correct, to report an error of the at least one channel unit.

The UE 1 may also comprise a transmitter/receiver 13 which is configured to provide a connection with, e.g., the eNB 2 and other network elements. For example, the UE 1 may send the report to the eNB 2.

The eNB 2 is an example for a network control element. The corresponding apparatus may also be only a part of the S-CSCF or the corresponding network control element.

The eNB 2 comprises a processor 21 and a memory 22 for storing instructions to be executed by the processor. The processor 21 is configured to perform transmission on a transmission channel, wherein the transmission channel is divided into a plurality of channel units (e.g., subcarriers, CCs, PRBs etc.), and to receive a report as to whether a channel prediction value for a at least one of the channel units is not correct.

The eNB 2 may also comprise a transmitter/receiver 23 which is configured to provide a connection with, e.g., the UE 1 and other network elements. For example, the eNB 2 may receive the report from the UE 1.

Thus, according to embodiments, a report is only sent when there is a prediction error on a channel unit. That is, a transmission of the report is only effected when it is needed. In this way, the reporting overhead can largely be reduced.

According to a more detailed embodiment of the present invention, the report may be sent on a dedicated channel, which may be on a pre-arranged uplink resource, e.g., on a PUCCH.

In this way, according to embodiments of the present invention, a low latency low rate CSI feedback channel is provided.

That is, in addition to the main feedback channel containing the information of channel prediction as well as per channel component reliability, a further low rate low latency feedback channel limited to reporting of failed PRBs is provided. Failed PRBs are those for which the prediction error is above a certain prediction accuracy threshold like e.g. above −10 dB.

The concept is similar to 'fly by wire' as used for airplanes, which are not able to fly without constant control actions and would otherwise fall to earth immediately. For JT CoMP the situation is similar, i.e. the system constantly tends to get out of the intended operation point, but by using the small amount of fast feedback information the central unit will be able to take the proper counter actions.

The detection of the failed PRBs is done based on a comparison at UE side (here FDD downlink CoMP is being assumed) between the predicted and reported and the actually measured radio channels.

In the following, some feedback channel design options are described. Generally there should be pre-arranged uplink resources for the physical uplink control channels (PUCCH) of all cooperating UEs so that the latency of the feedback is minimized.

Figure 3:
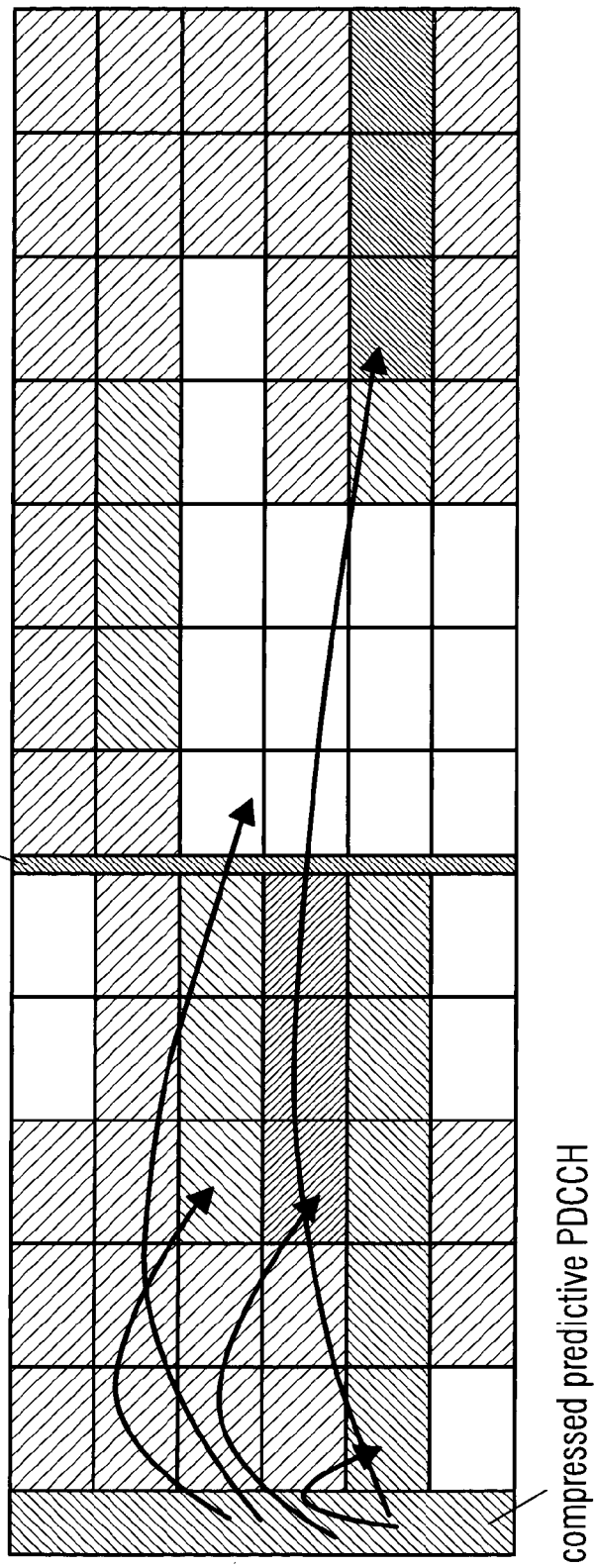
FIG. 3 illustrates a typical predictive scheduler.

Note, here the assumption is a channel prediction (plus predictive scheduling as illustrated in FIG. 3 for a prediction horizon of e.g. 100 ms and for nomadic users. In that case an e.g. 5 ms reporting period would be already sufficiently fast and really valuable. FIG. 3 illustrates a typical predictive scheduler where a set of N subframes (N e.g. equal to 10) is prescheduled in the first e.g. 3 symbols of the first subframe. Each rectangle illustrates one PRB. Different grey shades indicate different UEs with different C-RNTIs.

In the following, some reporting options are described in detail.

Reporting Option a)

In case of very few failed CCs, a bitmap with '1'-th for errored and a '0' for correctly predicted CCs is a most appropriate solution, since lossless compression (ZIP like coding) allows to reduce the raw data rate by more than 90%. Note it is sufficient to report the first occurrence of a threshold event and to report in the following reports a zero for the already failed PRBs.

Typical data rates per UE would be—assuming a realistic compression ratio of 80 to 90% and <=10% of errored CCs for 100 PRBs times 10 relevant CCs—in the range of ~100 bit/UE/report. For a fast reporting of every 5 ms the feedback rate would be 100/5 ms=20 kbit/s. Doing further subband reporting only for 25% of all PRBs then even 5 kbit/s would be possible.

Reporting Option b)

Alternatively, one might define semistatically an UE individual list of critical CCs and PRBs, which might fail soon, e.g. due to an already reported low reliability. By excluding highly reliable CCs from reporting, the feedback overhead can be reduced. Instead of a bitmap CCs and PRBs from the list might be directly addressed by e.g. 3 . . . 4 bit for the CC index and 1 . . . (4) . . . 7 bit for the PRB index. Assuming again 10% failed CCs the feedback rate could be less than 8 bit*0.1*100 PRB/5 ms=16 . . . 20 kbit/s per UE or in case of 30 active users a sum rate of 600 kbit/s . . . 1 Mbit/s for the PUCCH. In combination with a bitmap approach and a limitation to reporting of the worst case CC only few kbit/s per UE would be possible, partly due to higher compression ratios for the lossless compression.

Reporting Option c)

The UEs report only which of the CCs has been failed without any information about the affected PRB (or the other way round only PRB index without information about failed CC). This leads to a simplified reporting, even though there may be some restrictions for the precoder. Therefore, this option should be used advantageously only for very low number of failed CCs.

Reporting Option d)

Report only for scheduled CoMP UEs on those PRBs known to be scheduled from predictive scheduling.

Reporting Option e)

Quite different would be an analogue feedback, i.e. providing for each of the 36 WB beams and 100 PRBs one single resource—i.e. overall 36*100=3600 resource elements will be occupied—, where all active UEs will send with a certain UL power on the corresponding resource element, depending on the prediction error. The eNB can than estimate and detect from the superposition of all UEs those CCs and PRBs having no to very small prediction errors for all active UEs. Assuming LTE numerology the feedback overhead would be less than 5% and might be further optimized to e.g. 1%.

In the following it is described, how JT CoMP is adapted to error free channel components in opportunistic way according to embodiments of the present invention.

Based on the fast feedback about failed channel components the eNBs can decide about the best precoder adaptation. The idea is to keep JT CoMP only for those channel components where CSI prediction quality is sufficiently high. That is the reason why the solution according to embodiments of the present invention is called opportunistic or OP CoMP. It makes the best of the available CSI knowledge, given e.g. by a matrix similar to that as show in FIG. 5.

Figure 5:
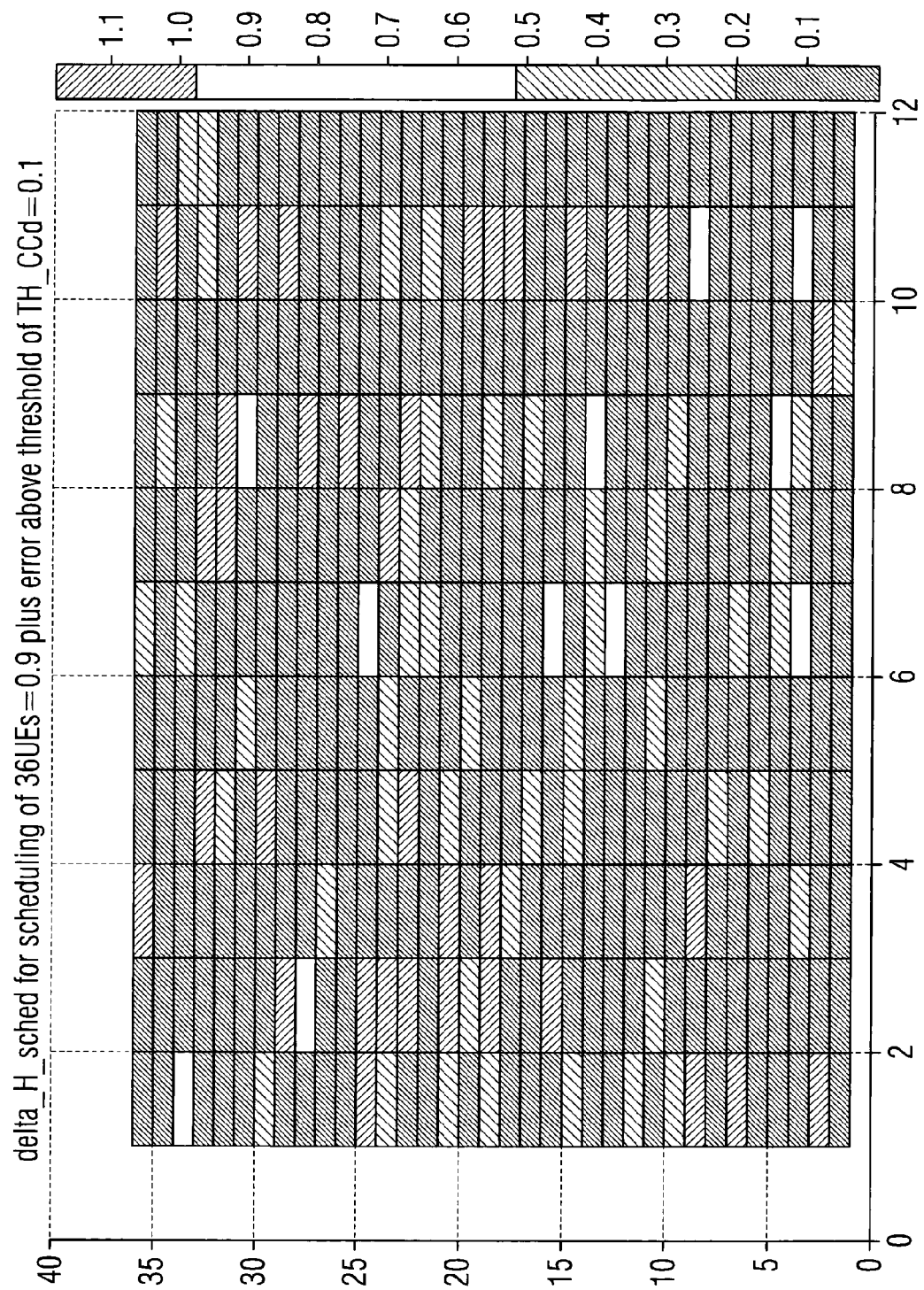
FIG. 5 illustrates a norm of error between predicted and real CSI for 36 UEs at one site with 3 cells and 4 antennas per cell according to an embodiment of the present invention.

FIG. 5 illustrates a norm of error between predicted and real CSI for 36 UEs at one site with 3 cells and 4 antennas per cell.

In the following, precoder adaptation is described. In case the eNB decides to keep the cooperation area as it is, it will have to adapt its precoder weights similar as illustrated in FIGS. 6, 7, 8 and 9.

Figure 6:
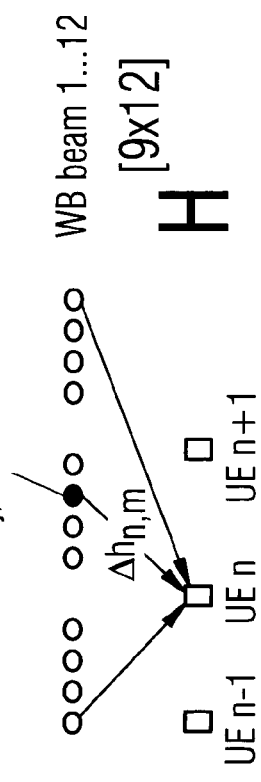
FIG. 6 illustrates a basic cooperation area of one site according to an embodiment of the present invention.
Figure 7:
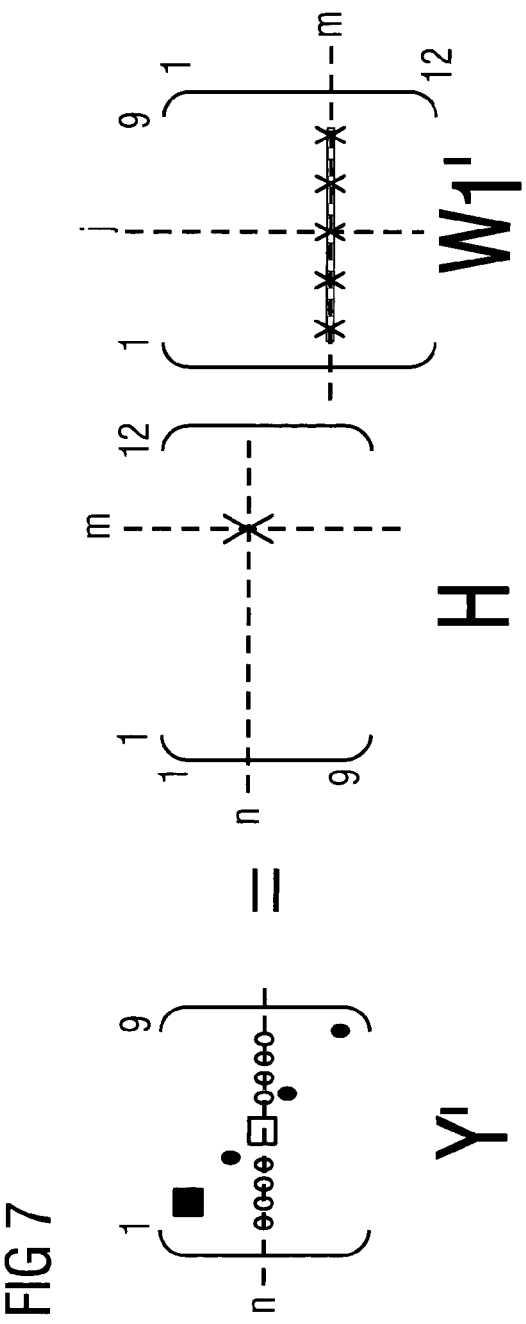
FIG. 7 illustrates an effect of one single errored channel component on the Rx matrix Y according to an embodiment of the present invention.
Figure 8:
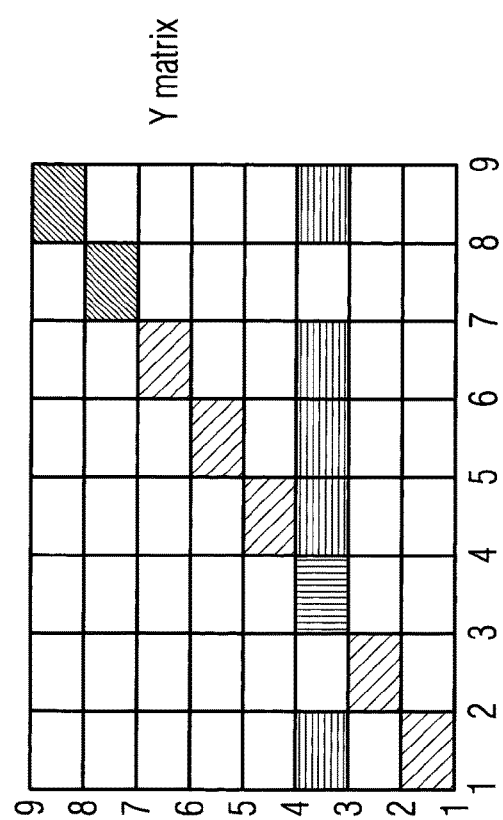
FIG. 8 illustrates a simulation of the effect of one single errored channel component on the Rx matrix Y according to an embodiment of the present invention.

FIG. 6 illustrates a basic cooperation area of one site with 3 cells and 4 antenna elements per cell serving e.g. 9 UEs. Thus, in this example 12 WB beams 1 . . . 12 are present which are indicated by circles. The channel component $h_{n,m}$ (which is indicated by a solid circle) is assumed to be errored. FIG. 7 illustrates the effect of one single errored channel component (indicated by an X in the matrix H) on the Rx matrix Y. FIG. 8 illustrates a simulation of the effect of one single errored channel component on the Rx matrix Y. In particular, in the blank components, no problem occurs, whereas the influence of the error is considerable on the diagonal components. The influence is indicated by different dots in the corresponding boxes. The horizontally hatched elements indicate intra cooperation interference terms for the UE 3.

Figure 9:
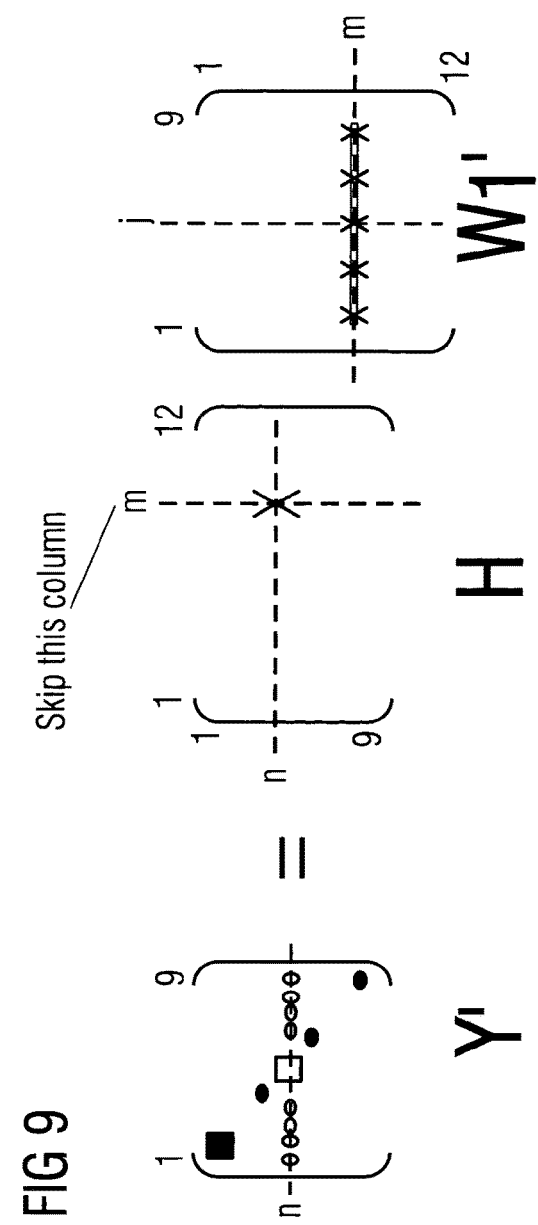
FIG. 9 illustrates a strategy for precoder adaptation according to an embodiment of the present invention.

FIG. 9 illustrates a strategy II for precoder adaptation (W to W2), i.e. skip row m of H. This means that wideband beam number m is not used at all for precoder W2.

That is, in a first option the eNB has to reduce the powers of all weights for all UEs having a strong precoding weight plus a low pathloss for the errored channel component. That way the maximum error is limited, but it might affect all UEs by corresponding lower SINRs or respectively lower modulation and coding schemes.

The alternative is to set the power for the corresponding channel component to zero for all UEs meaning that the rank of the overall channel from all eNBs to all simultaneously served UEs is reduced by one. In case of one or very few errored CCs the diversity order might be only slightly reduced so that the precoding normalization loss is as well only slightly increased.

Depending on the data rate loss for each option a weighted combination of both schemes is possible. Scheduling is vendor specific and UEs might be unaware of this precoder adaptation. So, in connection with some embodiments of the present invention as described above, only the reporting of failed CCs as introduced above is relevant.

In the following, an embodiment is described according to which CA size is adaptively shrinked, namely an alternative way of increasing robustness by splitting the large cooperation area (e.g. 27 UEs×36 WB beams) into smaller sub-cooperation areas of smaller size leading to a block diagonal channel matrix $H_{block}$ as well as precoding matrix $W_{block}$. That way per sub cooperation area the number of relevant CCs is reduced and accordingly the sensitivity to corresponding precoding errors of CCs.

A corresponding MATLB system level simulation applying the IMF-A framework for the large CA achieved a spectral efficiency of SE=7.07 bit/s/Hz/cell, being more than a factor of two larger than what is possible with LTE Advanced MU MIMO (about 3 bit/s/Hz/cell). Adding channel prediction errors to 1% of randomly selected CCs reduced the spectral efficiency to 4.1 bit/s/Hz/cell. By reducing the CA size to intra site cooperation i.e. to 3 CA a size 9×12 the spectral efficiency could be recovered to 5.93 bit/s/Hz/cell.

Here the idea of opportunistic CoMP (OP CoMP) is to use the largest possible size of the cooperation area whenever possible in an opportunistic way, i.e. depending on the quality of the available channel knowledge. In case there are no CSI errors (known from the fast feedback channel as defined above), the eNB will do precoding for the large CA resulting in the highest possible spectral efficiency. In case of some failed CCs the precoder might be adapted to some extent. In case the number of failed CCs is getting to large (few percent of all CCs) the size of the CAs will be shrinked step wise to increase robustness and performance.

Alternatively or in addition to the shrinking of the CA size the scheduling of simultaneously served users might be adapted compared to the original scheduling under the assumption of full channel knowledge. The idea is that by shrinking the cooperation size there will be remaining inter cooperation interference between these small cooperation areas. By coordinated scheduling or coordinated beamforming over the set of small CAs the most interfering CCs might be used with reduced power or even switched off. In case one or few of the CCs interfere with several UEs switching off this CC might benefit many UEs and might significantly increase the overall spectral efficiency.

Alternatively or in addition the UEs with more than one Rx antenna might adapt their interference rejection receiver (IRC) processing to cancel such strong inter CA interferers. Adaptation is required, as in case of the large CA the CA wide precoder will minimize this interfering CC so that the IRC can be used e.g. to cancel other next strongest interferers.

A new downlink (DL) control message is proposed, which informs the UEs about the currently used size of the cooperation areas. The size of the CAs might fluctuate depending on the simultaneously served UEs and the errors with respect to their relevant CCs in an opportunistic way. For example there might be 2 or 3 predefined sets of eNBs forming the main and the sub cluster CAs, which have been announced by corresponding broadcast or multicast messages to all UEs in a certain area. During DL transmission the eNB will than send as additional PDCCH information the actually selected size/set of the CAs with 1 to 2 bits.

The size of the cooperation area depends on the CCs actually used. Thus, the above downlink control message comprises information indicating which CCs are used and/or which CCs are not used.

As the channel prediction accuracy will get worse over time as one special solution the CA size might be set to maximum at the beginning of the prediction frame and in case the CA size has been shrinked for one of the PRBs it will be kept at this small size. In this way UEs can limit their further UL CSI feedback to the CCs of the shrinked CA.

The embodiments described above achieve the following benefits:

Embodiments of the present invention improve the robustness. That is, by the embodiments, the main challenge for JT CoMP implementations so far is solved, especially in combination with advanced channel prediction. As JT CoMP is separated into orthogonal sub problems over lower size sub cooperation areas the robustness against channel estimation and prediction errors can be significantly improved. Note, with increasing number of channel components the probability of precoding errors due to one or few badly predicted channel components raises drastically.

Assuming an operating point below full load—e.g. at 80% of full load—there will be room for some coordinated scheduling or beamforming and intra cooperation area interference will be often suppressed to a similar level as possible for full JT CoMP transmission over the large cooperation area, but with a significantly increased robustness against precoding errors do to the smaller size of the sub CAs.

A smart combination for the overall OP CoMP precoder of JT COMP, CB/CS, IRC processing, MU scheduling, smart antenna TX beamforming, power adaptation, antenna tilting, etc, results in a hybrid solution exploiting the best of each technique.

FIG. 10 illustrates an opportunistic (OP) CoMP scheduler as it might be used in the future. Taking much more information for scheduling into consideration as today. In detail, the opportunistic CoMP scheduler shown in FIG. 10 combines beside load, QoS and CSI information (PMI) as known for SoA schedulers furthermore failed prediction reports, reliability maps, CSI prediction reports, relative pathloss information and location or context awareness. Not shown—but relevant as well—are e.g. UE capabilities like IRC performance.

Thus, an opportunistic (OP) CoMP scheduler as described above may use the following information, for example:
failed prediction map very 5 ms per UE, PRB, WB beam, reliability map every 100 ms,
CSI prediction every 100 ms (200 MPCs, 10 bit/CC, ~5 CCs),
UE cancellation capabilities every 100 ms (2 bit/CC, ~10 CCs),
RSRP=pathloss every 1 s, per UE, per CA,
Queue length every 1 ms (QoS (best effort, CBR, . . . ),
BVDM update every 10 s (context aware information)
Power normalization loss every 4 ms, per user group, PRB, . . . .

The above list is only an example, and also the reporting intervals for the different kinds of information are only examples.

Based on the received information, the OP CoMP scheduler establishes a CoMP scheme (CS, DCS, JT . . . ).

It is noted that the embodiments and the present invention in general is not limited to the specific examples given above.

For example, instead of only reporting of failed CCs some further information how the CSI should be adapted might be send, e.g. a certain phase offset or amplitude change with respect to the predicted CSI.

The reporting of errored CCs is typically based on thresholds. For that reason a proper definition of these thresholds will have to be standardized, e.g. like power with respect to RSRP or with respect to power on certain PRB etc.

Small cells might be connected to the backbone over different access techniques with different capacities and latencies. Due to different delays channel prediction from different small cells will have different reliabilities. That way the varying backhaul performance can be taken into account over the reliability matrix at the OP CoMP precoder and/or the low rate low latency feedback channel. Small cell UEs might send the information about failed CCs either directly to the eNB or first to the small cell, which relays this information then to the eNB over the backbone infrastructure. In case of fibers the extra delay can be small, while the overall capacity of the low latency low rate UL feedback channel can be increased.

Beside mis-predicted channel components also missing user data at certain time instants at certain sites participating in the cooperation might trigger a temporarily reduction of the size of the CAs.

In case of many failed CCs (or missing user data) a fast fallback mode might be used like CS instead of JT CoMP or potentially an interference alignment precoder. In combination with predictive scheduling there might be no chance to inform the UEs about the changed transmission scheme. In that case UEs might be doing blind decoding attempts for a limited set of predefined transmission strategies in case they are not able to decode with the first expected decoding scheme (e.g. JT CoMP over full cooperation area). This is relevant e.g. in case of specific feed forward filters maximizing JT CoMP capacity. In case of CS or DCS these filters should be replaced by conventional MMSE or IRC filters adapting to the DMRS. The UEs have to be informed by corresponding messages about the transmission schemes the eNB will consider in future DL transmissions to prepare for corresponding Rx processing.

Backhaul transmission of user data might be adapted on the fly based on the eNB decisions about best fitting size of the CAs so that backhaul overhead is minimized.

In case of lossless compression the reporting threshold for errors might be adapted so that the e.g. semi-statically defined Zipped packet size is always sufficient. The threshold adaptation might be reported, but this is not really required.

Depending on the strength of a channel component the threshold for error reporting might be accordingly adapted so that each CC will generate the same precoding error, i.e. weak CCs might be allowed to have a larger absolute prediction error.

With increasing prediction horizon probability of bad CCs is increasing, i.e. there will be more CCs with typically larger deviations from the predicted CSI. This might be taken into account by providing more feedback options to the end of the predictively scheduled frame as well as by providing more scheduling flexibility, e.g. by underutilization of resources to the end of the frame.

From extended link level simulations so far it seems that even for large prediction horizons 80 to 90% of the CSI information can be predicted quite reliable and only some 10 to 20% will be failed PRBs. Even relative simple channel prediction techniques can provide a significant amount of channel knowledge, which in turn can be used for large JT CoMP gains.

For the precoder it is beneficial to group UEs having no to a maximum of one failed CC from the 12 WB beams forming the cooperation area. As it is a question of probability there might be UEs having more bad CCs. In that case the eNB might instruct these UEs to report for one to few of its unreliable CCs additional delta CSI information. That way improved performance can be achieved.

Based on the reliability information of certain channel components and the UE interference suppression capabilities the central scheduler might let the UEs cancel the most unreliable CCs. Under certain circumstances the UEs can beneficially adapt to varying channel conditions without any eNB involvement. For optimum decisions the eNB should know, which CCs will be cancelled by the UE. For CQI reporting of the optimum modulation and coding scheme (MCS) the UE should know which CC it will have to cancel and which interference will be suppressed by the eNB precoding. For that reason explicit control information with respect to CCs to be cancelled by an IRC receiver might be useful.

HetNet solutions put new challenges to JT CoMP precoding. For example small cells (SC) without fast backhaul link and potentially only over the air link might benefit from optimized RRM solutions.

Regarding channel prediction, it is noted that the current LTE MIMO modes can be also regarded as a special type of prediction with the assumption that the reported channel (PMI etc.) is just static. Thus, the mechanisms as described in embodiments above may also be applied to LTE MIMO modes.

According to further embodiments, the feedback, i.e., the report of errored CCs (as examples for channel units on which failed prediction was discovered) can be adapted. That is, for example the size of the reports and/or the threshold for reporting etc. can be increased with increasing prediction time. In this way, the effect of increasing probability for failed CCs can be captured. This can be done in a predefined and standardized manner.

In a specific embodiment, the reports might not only indicate the erorred channels, but send for the erorred channels some further information about the strength and/or the phase of the error so that the precoder can be adapted even better based on this information.

According to another aspect of embodiments of the present invention, an apparatus is provided which comprises
  means for receiving transmission on a transmission channel, wherein the transmission channel comprises a plurality of channel units via which transmission is carried out,
  means for obtaining channel prediction values for at least one of the plurality of channel units,
  means for determining whether the channel prediction value of the at least one channel unit is correct or not, and,
  means for reporting an error of the at least one channel unit in case the channel prediction value is not correct.

According to a further aspect of embodiments of the present invention, an apparatus is provided which comprises
  means for performing transmission on a transmission channel, wherein the transmission channel is divided into a plurality of channel units, and
  means for receiving a report as to whether a channel prediction value for a at least one of the channel units is not correct.

It is to be understood that any of the above modifications can be applied singly or in combination to the respective aspects and/or embodiments to which they refer, unless they are explicitly stated as excluding alternatives.

For the purpose of the present invention as described herein above, it should be noted that
  method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
  generally, any method step is suitable to be implemented as software or by hardware without changing the idea of the invention in terms of the functionality implemented;
  method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
  devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;
  an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
  a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising
  a processor; and
  a memory for storing instructions to be executed by the processor, wherein the processor is configured to:
    receive transmission on a transmission channel, the transmission channel includes a plurality of channel units via which transmission is carried out,
    obtain channel prediction values for at least one of the plurality of channel units,
    determine whether the channel prediction value of the at least one channel unit is correct or not by comparing the channel prediction value with an actually received channel value, and if the channel prediction value is not correct, determine whether a difference between the channel prediction value and the actually received channel value exceeds a prediction accuracy threshold, and
    report whether the channel prediction value of the at least one channel unit is correct or not.

2. The apparatus according to claim 1, wherein the processor is configured to:
  report an error of the at least one channel unit on a dedicated channel.

3. The apparatus according to claim 2, wherein the dedicated channel is on a pre-arranged uplink resource.

4. The apparatus according to claim 2, wherein the processor is configured to report the error of the at least one channel unit by:
  forming a map in which a plurality of channel units are mapped and channel units with a correct channel prediction value are indicated by a first indication value and channel units with an incorrect channel prediction value are indicated by a second indication value.

5. The apparatus according to claim 4, wherein the processor is configured to indicate a channel unit with the second indication value only upon a first occurrence of an error, and to indicate this channel unit upon a second occurrence with the first indication value.

6. The apparatus according to claim 4, wherein the processor is configured to compress the map.

7. The apparatus according to claim 1, wherein the processor is configured to report only for a group of channel units whether a channel prediction value is correct or not.

8. The apparatus according to claim 7, wherein the group of channel units comprises at least one of:
channel units considered unreliable based on earlier measurements, a specific type of channel units, and
channel units used for a specific cooperative multipoint transmission.

9. The apparatus according to claim 1, wherein the processor is configured to:
transmit a certain uplink power on the channel unit depending on an error.

10. The apparatus according to claim 1, wherein the processor is configured to:
receive a control message from a network control element including information regarding a size of a cooperation area, wherein the cooperation area includes a plurality of channel units, and the information indicates at least one of: channel units of the cooperation area which are to be used and channel units of the cooperation area which are not to be used.

11. The apparatus of claim 1, wherein the processor is further configured to:
report whether the difference between the channel prediction value and the actually received channel value exceeds the prediction accuracy threshold, if the channel prediction value is not correct.

12. An apparatus comprising:
a processor; and
a memory for storing instructions to be executed by the processor, wherein the processor is configured to:
perform transmission on a transmission channel, the transmission channel being divided into a plurality of channel units;
receive a report as to whether or not a channel prediction value for at least one of the channel units is correct or not; and
adapt a transmission scheme based on the report.

13. The apparatus according to claim 12, wherein the processor is configured to:
receive an error of the at least one channel unit on a dedicated channel.

14. The apparatus according to claim 13, wherein the dedicated channel is on a pre-arranged uplink resource.

15. The apparatus according to claim 12, wherein the report is in form of a map in which a plurality of channel units are mapped and channel units with a correct channel prediction value are indicated by a first indication value and channel units with an incorrect channel prediction value are indicated by a second indication value.

16. The apparatus according to claim 12, wherein the report indicates only for a group of channel units whether a channel prediction value is correct or not.

17. The apparatus according to claim 12, wherein the processor is configured to use for the transmission scheme only channel units for which no error was reported.

18. The apparatus according to claim 12, wherein the processor is configured to:
define a cooperation area including a plurality of channel units, the cooperation area including a size which depends on the number of channel units, and
reduce the size of the cooperation area by taking into account channel units for which errors were reported.

19. The apparatus according to claim 18, wherein the processor is configured to:
send control message to at least one user equipment, the control message including information regarding the size of the cooperation area, the information indicating at least one of: channel units of the cooperation area which are to be used and channel units of the cooperation area which are not to be used.

20. A method comprising:
receiving transmission on a transmission channel, the transmission channel includes a plurality of channel units via which transmission is carried out;
obtaining channel prediction values for at least one of the plurality of channel unit;
determining whether the channel prediction value of the at least one channel unit is correct or not by comparing the channel prediction value with an actually received channel value, and if the channel prediction value is not correct, determining whether a difference between the channel prediction value and the actually received channel value exceeds a prediction accuracy threshold; and,
reporting whether the channel prediction value of the at least one channel unit is correct or not.

21. The method of claim 20, and further comprising:
reporting whether the difference between the channel prediction value and the actually received channel value exceeds the prediction accuracy threshold, if the channel prediction value is not correct.

22. A method comprising
performing transmission on a transmission channel, the transmission channel being divided into a plurality of channel unit;
receiving a report as to whether or not a channel prediction value for at least one of the channel units is correct or not; and
adapting a transmission scheme based on the report.

* * * * *